United States Patent
Riedel (10) Patent No.: US 11,400,620 B2
(45) Date of Patent: Aug. 2, 2022

(54) METHODS AND APPARATUS FOR CURING COMPOSITE NACELLE STRUCTURE

(71) Applicant: The Boeing Company, Chicago, IL (US)

(72) Inventor: Brian L. Riedel, Summerville, SC (US)

(73) Assignee: The Boeing Company, Chicago, IL (US)

( * ) Notice: Subject to any disclaimer, the term of this patent is extended or adjusted under 35 U.S.C. 154(b) by 737 days.

(21) Appl. No.: 16/191,699

(22) Filed: Nov. 15, 2018

(65) Prior Publication Data

US 2019/0084193 A1 Mar. 21, 2019

Related U.S. Application Data

(62) Division of application No. 14/503,593, filed on Oct. 1, 2014, now Pat. No. 10,137,607.

(51) Int. Cl.
*B29C 35/02* (2006.01)
*B29L 31/00* (2006.01)
(Continued)

(52) U.S. Cl.
CPC .......... *B29C 35/0227* (2013.01); *B29C 35/04* (2013.01); *B29C 35/049* (2013.01);
(Continued)

(58) Field of Classification Search
CPC ... B29C 70/446; B29C 70/342; B29C 33/485; B29C 2035/0811; B29C 35/0805; B29C 70/32; B29C 33/02; B29C 70/44; B29C 33/505; B29C 70/462; B29C 35/0227; B29C 70/30; B29C 70/54; B29C 33/04; B29C 33/3842; B29C 33/48; B29C 35/007; B29C 70/34; B29C 70/443; B29C 70/48; B29C 70/86; B29C 33/0011; B29C 33/06; B29C 33/38; B29C 33/52; B29C 35/0272;
(Continued)

(56) References Cited

U.S. PATENT DOCUMENTS

| 4,693,678 A * | 9/1987 | Von Volkli ............ B29C 70/342 264/510 |
| 4,954,209 A * | 9/1990 | Baron ..................... B29C 43/32 156/583.1 |

(Continued)

*Primary Examiner* — Armand Melendez
(74) *Attorney, Agent, or Firm* — Ostrager Chong Flaherty & Broitman P.C.

(57) ABSTRACT

Methods and apparatus for curing curved cylinder-like workpieces (e.g., in the shape of a half or full barrel) made of composite material, such as nacelle honeycomb core composite sandwich structures. These methods enable tailored curing of composite nacelle structures, to significantly reduce capital cost and fabrication cycle time. In lieu of an autoclave or oven, a pressurized ring-shaped cure volume is defined by a partitioned enclosure that mimics the cylinder-like shape of the composite nacelle structure with only limited clearance (e.g., a partitioned enclosure comprising inner and outer concentric cylinder-like walls). A tool (e.g., a mandrel) and at least one composite nacelle structure supported thereon are placed in the cure volume for curing. Integrally heated tooling, optionally in combination with other heating methods, such as infrared heaters, is utilized to provide the temperature profile necessary for cure.

20 Claims, 5 Drawing Sheets

(51) Int. Cl.
*B29C 35/04* (2006.01)
*B29C 35/08* (2006.01)

(52) U.S. Cl.
CPC . *B29C 2035/0211* (2013.01); *B29C 2035/043* (2013.01); *B29C 2035/0822* (2013.01); *B29L 2031/7096* (2013.01)

(58) Field of Classification Search
CPC ..... B29C 35/04; B29C 43/3642; B29C 45/73; B29C 48/09; B29C 53/824; B29C 65/48; B29C 66/71; B29C 66/7212; B29C 70/021; B29C 70/545; B29C 70/865; B29C 2033/042; B29C 2035/0211; B29C 2035/043; B29C 2035/0816; B29C 2035/0822; B29C 2043/3649; B29C 33/0038; B29C 33/10; B29C 33/20; B29C 33/307; B29C 33/3828; B29C 33/42; B29C 33/76; B29C 35/049; B29C 39/10; B29C 45/641; B29C 48/07; B29C 48/13; B29C 53/562; B29C 66/494; B29C 66/634; B29C 66/721; B29C 70/222; B29C 70/42; B29C 70/523; B29C 70/543; B29C 70/544; B29C 70/68; B29C 70/84; B29C 2033/205; B29C 2033/385; B29C 2035/0855; B29C 2043/046; B29C 2043/3652; B29C 2043/3655; B29C 2043/3668; B29C 2045/14163; B29C 2045/2745; B29C 2045/2753; B29C 2045/7356; B29C 2045/7368; B29C 2791/001; B29C 2791/007; B29C 2945/76033; B29C 2945/76334; B29C 2945/76498; B29C 2945/76545; B29C 2945/76812; B29C 2945/76939; B29C 31/00; B29C 31/085; B29C 33/00; B29C 33/0044; B29C 33/046; B29C 33/08; B29C 33/12; B29C 33/202; B29C 33/301; B29C 33/306; B29C 33/34; B29C 33/3807; B29C 33/40; B29C 33/405; B29C 33/424; B29C 33/44; B29C 33/50; B29C 35/00; B29C 35/002; B29C 35/02; B29C 35/0266; B29C 35/0277; B29C 35/041; B29C 37/0007; B29C 37/0064; B29C 37/0082; B29C 39/02; B29C 43/003; B29C 43/04; B29C 43/14; B29C 43/52; B29C 43/54; B29C 44/00; B29C 44/1219; B29C 44/1271; B29C 44/588; B29C 44/60; B29C 45/0003; B29C 45/005; B29C 70/226; B29C 70/345; B29C 70/382; B29C 45/14778; B29C 45/14819; B29C 45/26; B29C 45/261; B29C 45/2622; B29C 45/2642; B29C 45/2673; B29C 45/2737; B29C 45/5008; B29C 45/66; B29C 45/7306; B29C 45/7312; B29C 45/7331; B29C 45/76; B29C 45/7653; B29C 45/77; B29C 48/0011; B29C 48/0012; B29C 48/0017; B29C 48/0022; B29C 48/05; B29C 48/06; B29C 48/10; B29C 48/12; B29C 48/151; B29C 48/154; B29C 48/156; B29C 48/16; B29C 48/21; B29C 48/2566; B29C 48/25686; B29C 48/2883; B29C 48/32; B29C 48/34; B29C 48/362; B29C 48/705; B29C 48/82; B29C 48/865; B29C 48/87; B29C 49/04; B29C 49/20; B29C 49/22; B29C 49/28; B29C 49/44; B29C 51/28; B29C 51/428; B29C 53/56; B29C 53/82; B29C 53/822; B29C 61/02; B29C 63/0021; B29C 63/06; B29C 63/10; B29C 63/14; B29C 63/24; B29C 64/106; B29C 64/112; B29C 64/118; B29C 64/129; B29C 64/188; B29C 64/194; B29C 64/30; B29C 64/40; B29C 65/00; B29C 65/02; B29C 65/4805; B29C 65/4835; B29C 65/5057; B29C 65/56; B29C 66/12821; B29C 66/1286; B29C 66/439; B29C 66/49; B29C 66/5324; B29C 66/5326; B29C 66/5344; B29C 66/61; B29C 66/69; B29C 66/72141; B29C 66/73751; B29C 66/73754; B29C 66/73941; B29C 66/7461; B29C 70/06; B29C 70/081; B29C 70/086; B29C 70/12; B29C 70/205; B29C 70/304; B29C 70/52; B29C 70/548; B29C 70/549; B29C 70/70; B29C 70/766; B29C 70/78; B29C 70/882; B29C 70/885; B29C 73/32; B29L 2031/3097; B29L 2031/3076; B29L 2031/3082; B29L 2031/7096; B29L 2023/00; B29L 2023/22

See application file for complete search history.

(56) References Cited

U.S. PATENT DOCUMENTS

| | | |
|---|---|---|
| 5,975,237 A | 11/1999 | Welch et al. |
| 6,655,939 B1 | 12/2003 | Petit et al. |
| 8,650,745 B2 | 2/2014 | Jacobsen et al. |
| 2008/0163976 A1* | 7/2008 | Lalande ............... B29C 70/462 156/148 |
| 2008/0230652 A1* | 9/2008 | Biornstad ............ B29C 53/587 244/120 |
| 2009/0236779 A1 | 9/2009 | Stubner et al. |
| 2010/0109208 A1* | 5/2010 | Hubert .................. B29C 33/48 264/571 |
| 2012/0288655 A1 | 11/2012 | Havens et al. |
| 2014/0360653 A1 | 12/2014 | Halford |

* cited by examiner

METHODS AND APPARATUS FOR CURING COMPOSITE NACELLE STRUCTURE

RELATED PATENT APPLICATION

This application is a divisional of and claims priority from U.S. patent application Ser. No. 14/503,593 filed on Oct. 1, 2014, which issued as U.S. Pat. No. 10,137,607 on Nov. 27, 2018.

BACKGROUND

This disclosure generally relates to methods and apparatus for fabricating composite structures. In particular, this disclosure relates to methods and apparatus for curing composite structures, such as honeycomb sandwich composite structures.

Airplane manufacturers are under increasing pressure to produce lightweight, strong, and durable aircraft at the lowest cost for manufacture and life-cycle maintenance. An airplane must have sufficient structural strength to withstand stresses during flight, while being as light as possible to maximize the performance of the airplane. To address these concerns, aircraft manufacturers have increasingly used fiber-reinforced resin matrix composites.

These composites provide improved strength, fatigue resistance, stiffness, and strength-to-weight ratio by incorporating strong, stiff, carbon fibers into a softer, more ductile resin matrix. The resin matrix material transmits forces to the fibers and provides ductility and toughness, while the fibers carry most of the applied force. Unidirectional continuous fibers can produce anisotropic properties, while woven fabrics produce quasi-isotropic properties. Honeycomb core is often sandwiched between composite sheets to provide stiff panels having the highest specific strength. More specifically, honeycomb core sandwich panels or composite structures, which typically comprise composite laminate skins co-cured with adhesives to the honeycomb core, are widely used in aerospace applications, among others, because of their high stiffness-to-weight (i.e., "specific stiffness") and strength-to-weight (i.e., "specific strength") ratios.

Honeycomb sandwich composite structures may be fabricated utilizing various composite forming methods. The most commonly employed technique involves the use of a vacuum bag molding assembly wherein an impervious membrane or "vacuum bag" is employed for consolidating the composite skins or layers and ensuring proper adhesion thereof to the centrally disposed honeycomb core. More specifically, the lower or base composite skin, the honeycomb core, and the upper or face composite skin are sequentially laid in a rigid mold member so that the honeycomb core is overlaid or covered by the upper and lower composite skins. The upper and lower composite skins are typically formed from uncured "prepreg" or "B-stage" laminates that comprises a fiber reinforcement such as graphite, aramid, or fiberglass fibers (e.g., linear, weaves, or both) disposed in a binding polymeric matrix such as epoxy, phenolic, or other similar organic resinous material. Film adhesive typically forms the bonds between the upper and lower composite skins and the honeycomb core. A vacuum bag is disposed over the rigid mold member and seals thereto, thereby forming a mold cavity that is occupied by the uncured/unbonded composite lay-up. The mold cavity is then evacuated to subatmospheric pressure within the mold, and superatmospheric pressure is applied to the exterior (in an autoclave), and the temperature of the composite lay-up is increased while in the autoclave to cure the lay-up. The combination of subatmospheric internal pressure and superatmospheric external pressure consolidate the composite skins, remove air and volatiles from the resin binder, and apply the necessary compaction pressure to ensure full and uniform adhesion of the lay-up.

Because of the noise regulations governing commercial transport aircraft, high bypass engines incorporate acoustic panels within the nacelles. Conventionally, these elements are made with an inner perforated skin, a surrounding buried septum honeycomb core, and a non-perforated outer skin.

Curing of complex composite nacelle structures traditionally requires an autoclave to provide the temperature and pressure necessary for cure. Due to the high capital cost, autoclaves are typically sized to cure multiple parts in a batch, and the cost of purchase and operation is high due to the volume. Other methods of manufacturing, such as resin infusion, have been successfully used to eliminate the need for an autoclave or oven. However, nacelle honeycomb core composite structures, including nacelle acoustic structures in their current architecture, cannot be readily manufactured using other methods.

Improvements in methods for curing nacelle honeycomb core composite sandwich structures that reduce costs and increase production rates are wanted.

SUMMARY

The subject matter disclosed herein is directed to methods and apparatus for curing curved cylinder-like workpieces (e.g., in the shape of a half or full barrel) made of composite material, such as nacelle honeycomb core composite sandwich structures. The methods disclosed herein enable tailored curing of curved cylinder-like workpieces, such as composite nacelle structures, to significantly reduce capital cost and fabrication cycle time. These methods take advantage of the cylinder-like (e.g., the diameter may vary in an axial direction) geometry associated with nacelle components.

In lieu of an autoclave or oven, a pressurized ring-shaped cure volume is defined by a partitioned enclosure that mimics the cylinder-like shape of the uncured composite nacelle structure with only limited clearance (e.g., a partitioned enclosure comprising inner and outer concentric cylinder-like walls). In accordance with some embodiments, the top and bottom of the enclosure volume are defined by a fixed bottom plate and a movable top plate; the top plate is attached or connected to a pair of concentric cylinder-like walls; and a tool (e.g., a mandrel) and one or more composite nacelle structures supported thereon are disposed in the ring-shaped cure volume for curing. Integrally heated tooling, optionally in combination with other heating methods, such as infrared heaters, is utilized to provide the temperature profile necessary for curing the uncured composite nacelle structure. No changes in part configuration or materials are required, so the architecture of nacelle acoustic structures and weight efficiency of honeycomb core sandwich structure can be preserved.

The methods and apparatus disclosed in detail hereinafter eliminate the need for a typical autoclave but retain the ability to use equivalent temperature and pressure for adequate cure, and significantly reduce the cure system cost. Furthermore, the mode(s) of heat transfer used in the methods disclosed in detail below enable more rapid and uniform heating. This reduces cure cycle time and energy consumption, and ensures superior part cure quality. Finally, the methods and apparatus disclosed herein provide an approach to composite part cure that is "right-sized" to the part and thus supports lean manufacturing objectives.

One aspect of the subject matter disclosed in detail below is an apparatus for curing a composite structure, comprising: an enclosure comprising a top plate, a base, and an outer wall disposed between the top plate and the base, the outer wall having a closed contour; an inner wall disposed between the top plate and the base and surrounded by the outer wall, the inner wall having a closed contour, wherein surfaces of the inner and outer walls, the top plate, and the base define a ring-shaped cure volume; and a hollow tool comprising a surface having a closed contour and heating elements, wherein the hollow tool surrounds the inner wall, is surrounded by the outer wall, and is thermally coupled to the composite structure to allow heat transfer from the heating elements to the composite structure. In accordance with some embodiments, the heating elements transform electric current into heat. In accordance with other embodiments, the heating elements carry heated fluid. The apparatus may further comprise a heater attached to an outer surface of the inner wall and/or a heater attached to an inner surface of the outer wall.

Another aspect of the subject matter disclosed herein is a method for curing a composite structure, comprising: (a) forming a tool-composite structure assembly by placing an uncured composite structure in contact with a surface of a tool having a closed contour and having integrated heating elements; (b) placing the tool-composite structure assembly on a base; (c) enclosing a ring-shaped cure volume having an outer boundary that surrounds the tool; (d) activating the integrated heating elements to heat the uncured composite structure during a cure cycle; and (e) producing a specified pressure inside the ring-shaped cure volume during the cure cycle. The method may further comprise: removing the tool-composite structure assembly from the ring-shaped cure volume; and demolding the composite structure from the tool. In accordance with some embodiments, the uncured composite structure has a closed contour, surrounds the tool and is surrounded by the outer boundary of the ring-shaped cure volume. The method further comprises coupling the heating elements integrated in the tool to a source of energy after step (b) and prior to step (d).

A further aspect of the subject matter disclosed herein is an apparatus for curing a composite structure, comprising: an enclosure comprising a top plate, a base, and a wall disposed between the top plate and the base, the wall having a closed contour; a tool disposed between the top plate and the base and surrounded by the wall, the tool comprising a surface having a closed contour and heating elements, wherein the surface of the tool and respective surfaces of the wall and the top plate at least partly define a ring-shaped cure volume, and the tool is thermally coupled to the composite structure to allow heat transfer from the heating elements to the composite structure. In accordance with some embodiments, the cure volume is further partly defined by a surface of the base. This apparatus may further comprise means for coupling the heating elements in the tool to a source of energy and a heater attached to an inner surface of the wall. In accordance with some embodiments, the heating elements transform electric current into heat and the source of energy is a current generator electrically coupled to the heating elements. In accordance with other embodiments, the heating elements carry heated fluid and the source of energy is a source of heated fluid.

Yet another aspect is a system comprising: an enclosure comprising a top plate, a base, and an outer wall disposed between the top plate and the base, the outer wall having a closed contour that forms an outer boundary of an internal volume of the enclosure; a means for partitioning the internal volume of the enclosure to form a ring-shaped cure volume disposed between the wall and the partitioning means; an uncured composite structure disposed within the cure volume; heating elements situated to heat the uncured composite structure during a cure cycle; and means for producing a specified pressure inside the cure volume during the cure cycle. In accordance with some embodiments, the means for partitioning comprises a tool comprising a surface having a closed contour, the heating elements being integrated in the tool, and the tool being surrounded by the outer wall and thermally coupled to the uncured composite structure to allow heat transfer from the heating elements to the uncured composite structure. In accordance with other embodiments, the means for partitioning comprises an inner wall, the apparatus further comprising a hollow tool comprising a surface having a closed contour, the heating elements being integrated in the hollow tool, wherein the hollow tool surrounds the inner wall, is surrounded by the outer wall, and is thermally coupled to the uncured composite structure to allow heat transfer from the heating elements to the uncured composite structure.

Other aspects of methods and apparatus for curing composite nacelle structures are disclosed and claimed below.

BRIEF DESCRIPTION OF THE DRAWINGS

Reference will hereinafter be made to the drawings in which similar elements in different drawings bear the same reference numerals.

DETAILED DESCRIPTION

Various embodiments of an apparatus having a ring-shaped cure volume for curing cylinder-like composite structures, such as composite nacelle structures, wrapped around the surface of a tool will now be described in detail for purposes of illustration only. The apparatus comprises an enclosure that defines a ring-shaped cure volume in which the uncured composite structure is disposed. In accordance with the embodiment shown in FIGS. 1, 2 and 4 (described in detail below), the inner and outer boundaries of the ring-shaped cure volume are respectively formed by inner and outer walls (also referred to herein as "plug" and "sleeve" respectively) which extend from a top plate to a base. The uncured composite structure is supported by and in contact with a surface of a tool having a closed contour, which tool is disposed within the ring-shaped cure volume. In accordance with another embodiment, the tool that supports the uncured composite structure forms the inner boundary of the ring-shaped cure volume, as will be described in detail below with reference to FIG. 5.

Figure 1:
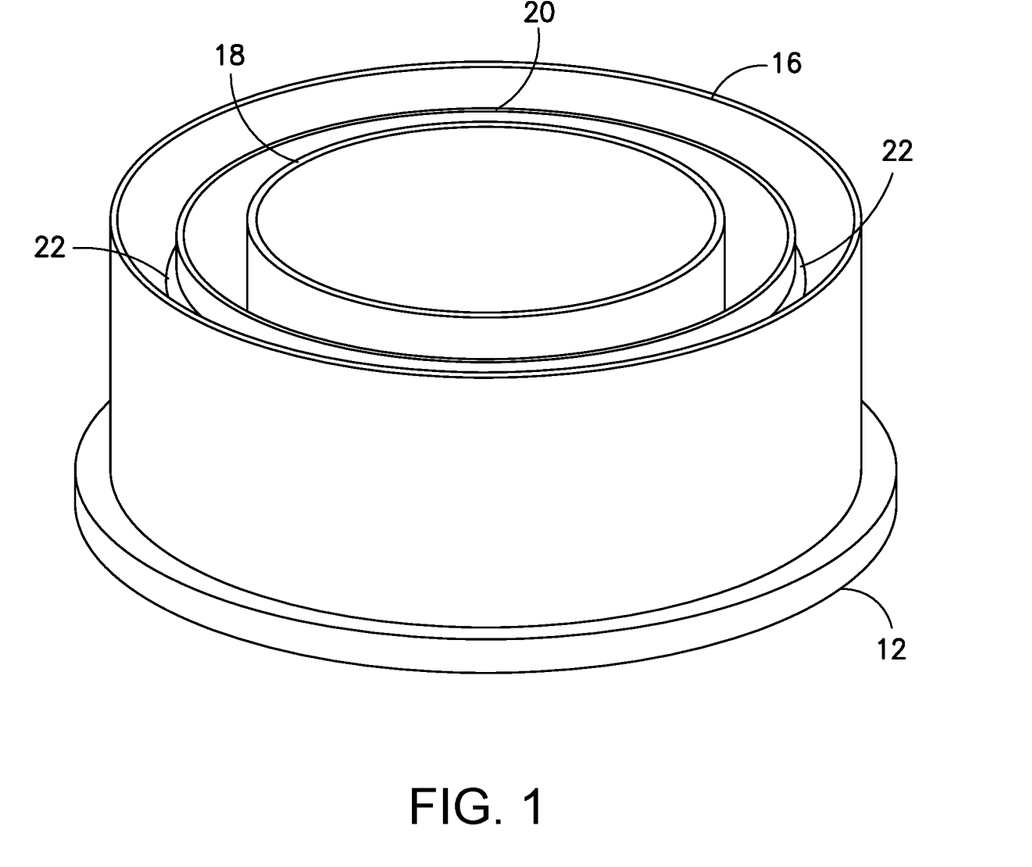
FIG. 1 is a diagram representing an isometric view showing the geometry of some components of an assembled apparatus for curing a composite nacelle structure in accordance with some embodiments. The assembled apparatus is shown with a top plate of an enclosure removed.
Figure 2:
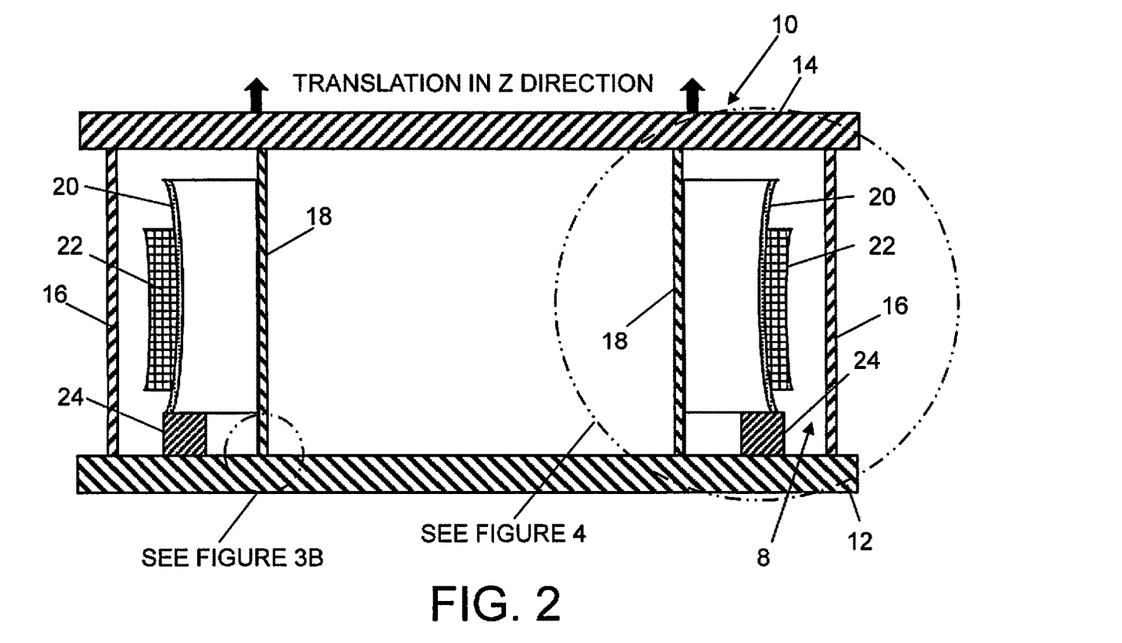
FIG. 2 is a diagram representing a sectional view of some components of an assembled apparatus for curing a composite nacelle structure in accordance with one embodiment.

A first illustrative geometry of an apparatus for curing a composite structure 22 is schematically depicted in FIGS. 1 and 2. FIG. 1 represents an overall isometric view of components of the apparatus with a top plate omitted, while FIG. 2 represents a sectional view of an apparatus including a top plate 14. In this example, an uncured cylinder-like composite structure 22 is completely wrapped around and supported by a tool 20, which may take the form of a hollow mandrel made of metal or composite material. The resulting tool-composite structure assembly is disposed between a plug 18 and a sleeve 16, which (as best seen in FIG. 1) may comprise concentric circular cylindrical inner and outer walls respectively.

Preferably, the profile of tool 20 is a closed contour. The tool 20 (or tools) can be a closed volume or may be segmented and still work. The external surface of tool 20 may be shaped to conform to the inner mold line of the composite structure 22. If the inner mold line of the composite structure 22 is axially symmetric, then the external surface of tool 20 will approximate a surface of revolution. Examples of surfaces of revolution generated by a straight line are cylindrical and conical surfaces, depending on whether or not the line is parallel to the axis. Surfaces of revolution generated by a curved line have a radius that varies along the axis. If the inner mold line of the composite structure 22 is not axially symmetric, then the external surface of tool 20 will not approximate a surface of revolution.

As shown in FIG. 2, the upper ends of plug 18 and sleeve 16 are attached or connected to the top plate 14, while the lower ends of plug 18 and sleeve 16 are seated on a base 12, which may comprise a circular plate. Respective surfaces of base 12, top plate 14, and sleeve 16 form an enclosure 10 having an internal volume which is partitioned to form a ring-shaped cure volume 8. In this embodiment, the internal volume of the enclosure 10 is partitioned by plug 18, which forms the radially inner boundary of the ring-shaped cure volume 8, while sleeve 16 forms the radially outer boundary of the ring-shaped cure volume 8. The assembly comprising tool 20 and composite structure 22 is disposed within the ring-shaped cure volume 8. System interfaces for providing electrical power and for controlling the pressure inside the ring-shaped cure volume 8 may be incorporated in top plate 14 or base 12. In addition, equipment for monitoring the temperature and pressure inside the ring-shaped cure volume 8 may be incorporated in top plate 14 or base 12.

Figure 7:
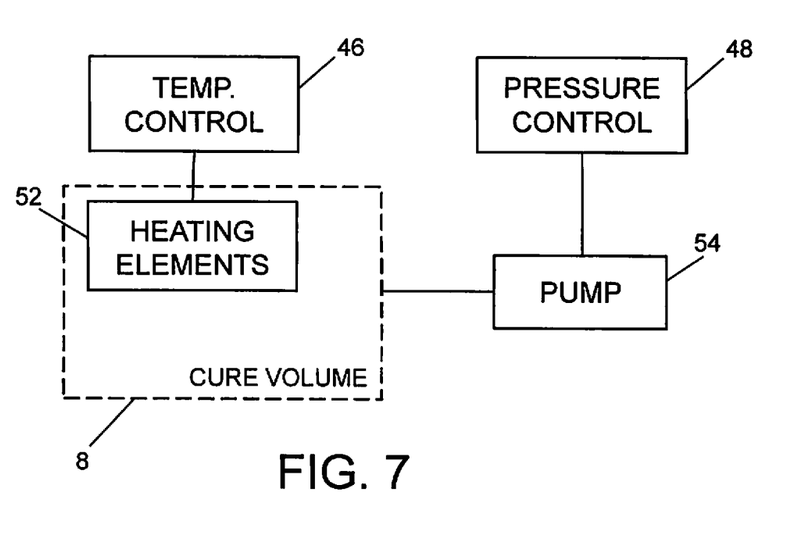
FIG. 7 is a block diagram showing some subsystems of a system for curing a composite nacelle structure in accordance with various embodiments.

Although not shown in FIGS. 1 and 2, the tool 20 has a multiplicity of heating elements integrated therein (see, e.g., heating elements 52 in FIG. 7). These heating elements may be distributed around the entire circumference of tool 20 and are thermally coupled to the composite structure 22 via the tool surface (which is in contact with the composite structure 22) to allow conduction and/or radiation of heat from the heating elements into the composite structure 22. In accordance with some embodiments, the heating elements are resistive heating elements, embedded in tool 20, which transform electric current into heat. In accordance with other embodiments, the heating elements embedded in tool 20 are pipes, tubes or capillaries which carry heated fluid (e.g., superheated steam or hot oil).

The apparatus further comprises means for coupling the heating elements in tool 20 to a source of energy (not shown in FIG. 2). In the example shown in FIG. 2, the tool 20 is seated on a circular manifold 24, which manifold 24 in turn is attached or connected to the base 12 and coupled to provide heating. The manifold 24 is disposed between sleeve 16 and plug 18. In cases where resistive heating elements are used, the manifold 24 may comprise electrical conductors and switches for providing electrical current from a current generator to the resistive heating elements. In cases where the heating elements convey heated fluid, the manifold 24 may comprise pipes, tubes or channels incorporated in tool 20 for distributing heated fluid current from a source of heated fluid to the distribution network inside the manifold 24.

The apparatus shown in FIGS. 1 and 2 is suitable for curing composite nacelle structures. Given the generally cylindrical shape of composite nacelle structures, it is assumed for the purpose of illustration only that tool 20 and composite structure 22 are surfaces of revolution. However, it should be appreciated that, in the alternative, tool 20 and composite structure 22 do not need to be surfaces of revolution. In addition, as explained in detail below, the composite structure need not have a closed contour. To simplify the discussion, it is also assumed herein that sleeve 16 and plug 18 are circular cylindrical. However, it should be appreciated that, in the alternative, sleeve 16 and plug 18 do not need to be circular or cylindrical.

The composite structure 22 depicted in FIGS. 1 and 2 may comprise any one of the following typical nacelle composite structures:

(a) an inlet inner acoustic panel in one 360-degree structure or in a plurality of segments, depending on the design;

(b) a fan cowl panel, typically in two segments of approximately 160 degrees each;

(c) a thrust reverser outer acoustic panel, typically in two segments of approximately 160 degrees each;

(d) a thrust reverser outer cowl panel, typically in two segments of approximately 160 degrees each; or (e) a thrust reverser inner wall panel (which, although not completely cylindrical, could conceivably be cured using the apparatus disclosed herein).

Still referring to FIGS. 1 and 2, the tool 20 may take the form of a bond assembly jig that is used as the layup and cure mandrel for the composite structure. The tool 20 can be designed to be integrally heated using known methods (e.g., electrical heating elements, fluid heating, etc.). The tool 20 is preferably indexed to the base 12, for example, using mechanical guides and pins in a well-known manner. The tool 20 may also be designed to allow de-molding of the composite structure 22 as required using existing tool design approaches.

Figure 4:
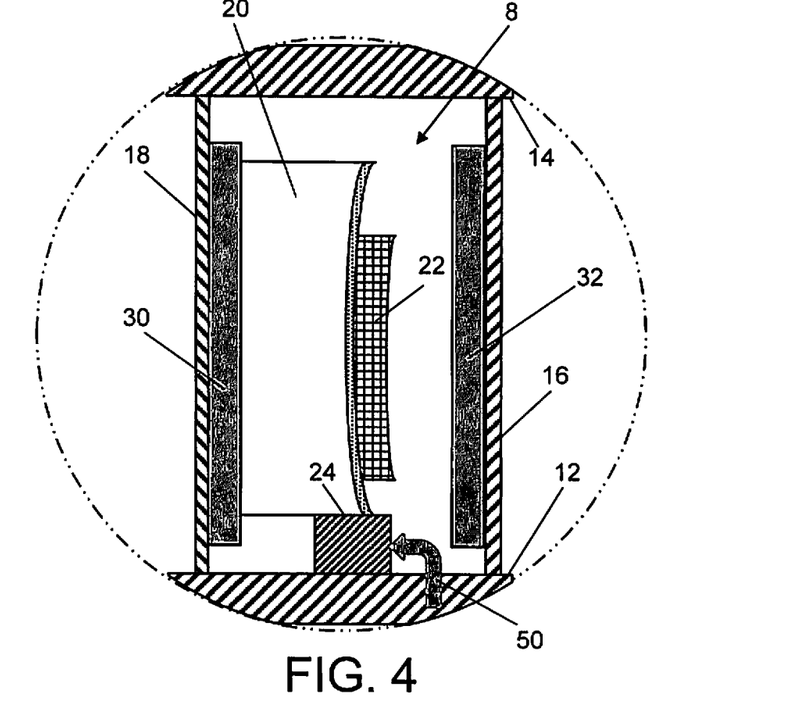
FIG. 4 is a diagram representing a sectional view of a portion of an assembled part curing enclosure containing a tool-mounted part to be cured (the depicted portions being indicated by a dashed circle in FIG. 2) in accordance with one embodiment.

The base 12 depicted in FIGS. 1 and 2 is the platform on which the tool 20 rests during a curing operation. As depicted in FIG. 4, the base 12 also have provisions 50 for connecting the manifold 24 to the energy source (e.g., electrical supply or heated fluid source). In addition, the sleeve 16 and plug 18 could be fitted with suitable heaters in a suitable pattern around their circumferences to provide uniform heating. FIG. 4 shows one heater 30 attached to an outer surface of plug 18 and another heater 32 attached to an inner surface of sleeve 16. Similar heaters can be placed around the respective circumferences of sleeve 16 and plug 18.

Referring again to FIG. 2, the sleeve 16 forms the outer boundary of ring-shaped cure volume 8. Sleeve 16 is designed to withstand cure pressure and sized diametrically to minimize the cure volume. The top of sleeve 16 may be attached or connected to the top plate 14 so that the sleeve 16 is raised or lowered when the top plate 14 is raised or lowered. The bottom of sleeve 16 can be sealed against the base 12 by means of a typical high-temperature pressure seal. The sleeve 16 should be designed to minimize heat loss during the cure cycle and may be provided with additional heating elements.

The plug 18 forms the inner boundary of the ring-shaped cure volume 8. Plug 18 is also designed to withstand cure pressure and sized diametrically to minimize the cure volume. The top of plug 18 may be attached or connected to the top plate 14 so that the plug 18 is also raised or lowered when the top plate 14 is raised or lowered. The bottom of plug 18 can also be sealed against the base 12 by means of a typical high-temperature pressure seal. The plug 18 should also be designed to minimize heat loss during the cure cycle and may be provided with additional heating elements. The plug 18 would not be required if it is acceptable for the entire cylindrical volume to be the cure volume, based on impact to the equipment and cure cycle.

Figure 3A:
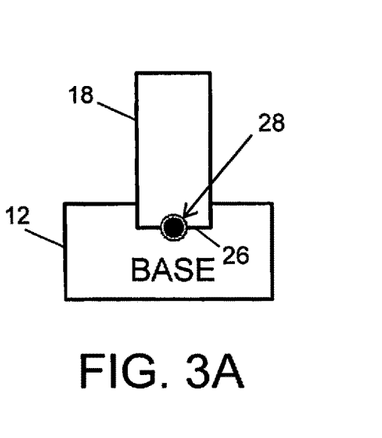
FIG. 3A is a diagram representing a sectional view of a portion of a sealed interface between an annular recess in a base and a bottom edge of a plug in accordance with one embodiment.
Figure 3B:
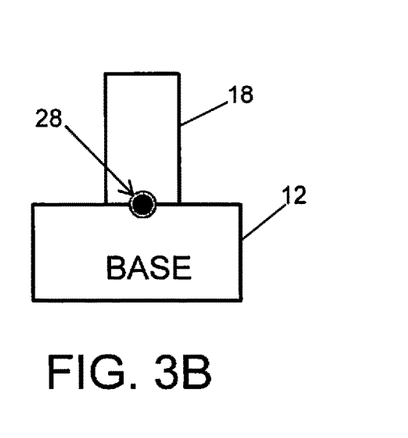
FIG. 3B is a diagram representing a sectional view of a portion of a sealed interface (indicated by a dashed circle in FIG. 2) between a base and a bottom edge of a plug in accordance with another embodiment.

FIGS. 3A and 3B are detailed views taken from FIG. 2 that show respective interfaces between base 12 and the bottom of plug 18 in accordance with respective implementations.

In the implementation depicted in FIG. 3B, the plug-base interface is a planar interface comprising a seal 28 (e.g., an O-ring with opposing seal grooves formed in the surface of base 12 and the end face of plug 18). The bottom of the sleeve 16 can be sealed to the base 12 in a similar manner.

In the implementation depicted in FIG. 3A, the interface is a recessed interface comprising a seal 28. This recessed interface comprises a recess 26 formed in base 12 which receives the bottom of plug 18, either with or without draft (e.g., beveling) on the base surface to facilitate insertion. This recessed interface could be designed to react cure pressure loads. The bottom of the sleeve 16 can be sealed to the base 12 in a similar manner.

Figure 5:
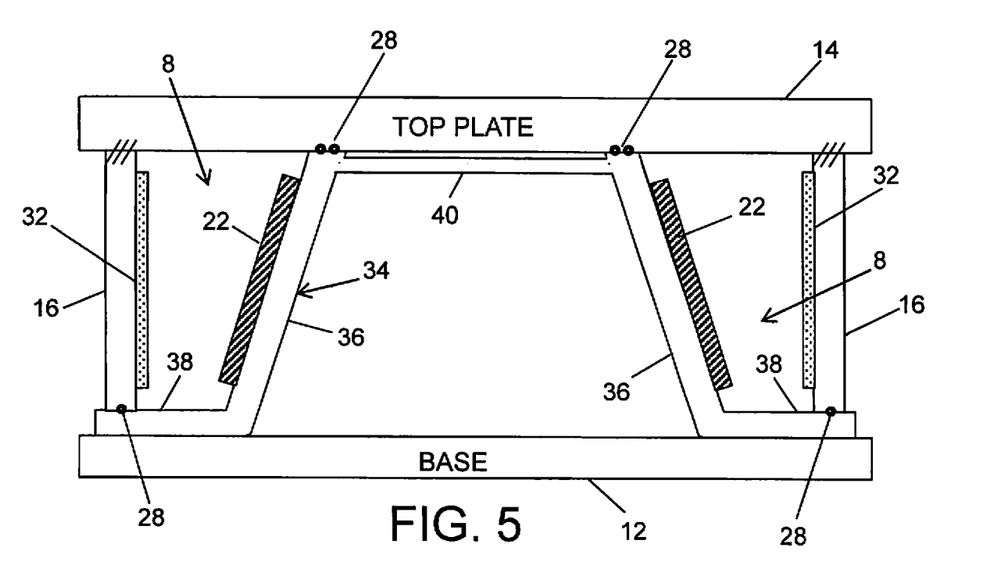
FIG. 5 is a diagram representing a sectional view of some components of an assembled apparatus for curing a composite nacelle structure in accordance with a plug-less embodiment.

FIG. 5 is a diagram representing a sectional view of some components of an assembled apparatus for curing a cylinder-like composite nacelle structure in accordance with an alternative embodiment which does not use a plug. In accordance with this concept, a portion of a tool 34 forms the inner boundary of the ring-shaped cure volume 8 and the plug is eliminated. The tool 36 has heating elements (of the types previously described) integrated therein and should be designed to withstand the cure pressure. The tool 34 is thermally coupled to the composite nacelle structure 22 to allow conduction and/or radiation of heat from the heating elements to the composite nacelle structure 22.

In accordance with the implementation depicted in FIG. 5, the tool 36 comprises a cylinder-like wall 36, an annular radial flange 38 connected to a bottom of the conical wall 36 and seated on the base 12, and a horizontal member 40 disposed inside and connected to the cylinder-like wall 36 near the top of the latter. Respective surfaces of the top plate 14, sleeve 16, cylinder-like wall 36, and annular radial flange 38 define a ring-shaped cure volume 8. The top of the cylinder-like wall 36 abuts the top plate 14 with a pair of seals 28 therebetween. The bottom of sleeve 16 abuts the annular radial flange 38 of tool 34 with a seal 28 therebetween. An appropriate interface between the heating elements integrated in the tool 34 and the source of energy (e.g., heated fluid or electric current) can be provided in the base 12, the interface elements being aligned by manipulation of tool 34 as it is lowered onto the base 12.

The horizontal member 40 may be designed to withstand the cure pressure in ring-shaped cure volume 8. For example, horizontal member 40 may comprise a plate with supporting structure as required to react pressure loads. In accordance with an alternative implementation, the annular radial flange 38 and horizontal member of tool 34 could be eliminated if the cylinder-like wall 36 were designed to react pressure loads, with or without reaction of pressure loads by top plate 14 and base 12. In this case the top and bottom of the cylinder-like wall 36 of tool 34 will be respectively sealed to top plate 14 and base 12.

Figure 6:
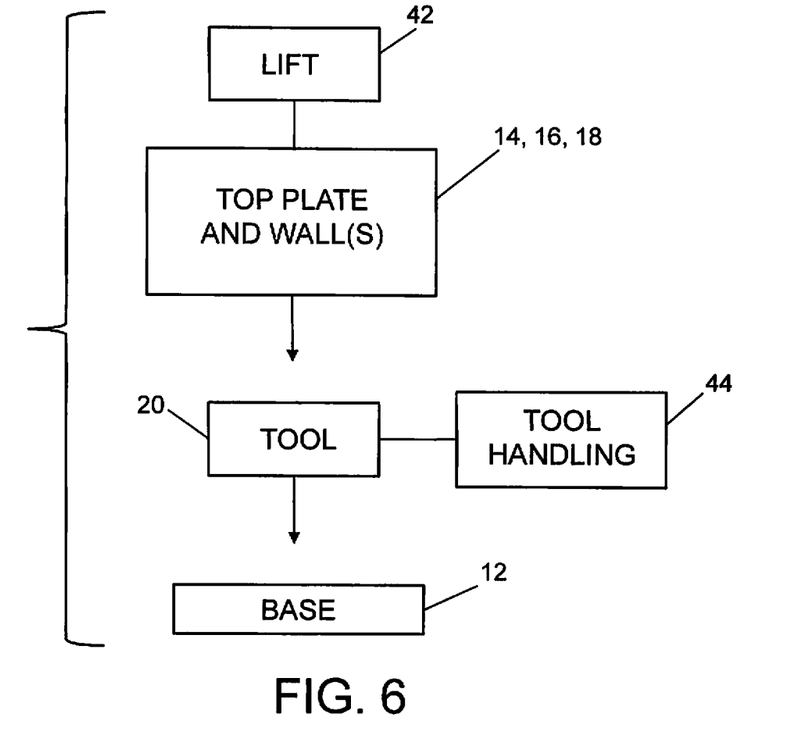
FIG. 6 is a block diagram showing some components and subsystems of a system for assembling the apparatus depicted in FIG. 2 or 5.

The apparatus depicted in FIG. 2 is assembled by first placing an uncured composite structure 22 in contact with a surface of a tool 20 having a closed contour and having integrated heating elements, the result being a tool-composite structure assembly. That tool-composite structure assembly is then placed on a base 12. FIG. 6 is a block diagram showing some components and subsystems of a system for assembling the apparatus depicted in FIG. 2. The tool 20 (with the uncured composite structure supported thereon) is manipulated (indicated by a downward arrow in FIG. 6) into proper position (using indexing) onto the base 12 by tool handling equipment 44. When the tool 20 is positioned correctly, the heating elements integrated in the tool 20 will be coupled to a source of energy via the manifold 24 seen in FIG. 2. After the heating elements have been successfully coupled, the top plate 12, with sleeve 16 and plug 18 attached or connected thereto, is lowered (indicated by a downward arrow in FIG. 6) into position using lifting equipment 42. More specifically, the rigid structure formed by top plate 14, sleeve 16 and plug 18 is lowered until the bottom edges of sleeve 16 and plug 18 abut and are sealed against the upper surface of base 12, as seen in FIG. 2. Optionally, the bottom edges of sleeve 16 and plug 18 are inserted into recesses formed in base 12, as depicted in FIG. 3A.

Upon completion of the assembly of the apparatus depicted in FIG. 2, an airtight ring-shaped cure volume 8 is formed. The temperature and pressure inside the cure volume are then controlled in accordance with the cure cycle specified for the particular uncured composite structure being cured. As depicted in FIG. 7, the heating elements 52 inside the cure volume 8 are activated by a temperature control system 46 while a specified pressure is produced inside the cure volume 8 by a pump 54 operated by a pressure control system 48. The heating elements 52 includes at least a plurality of heating elements integrated in the tool, which heat the uncured composite structure by thermal conduction and/or radiation, and optionally also includes heaters 30 and 32 seen in FIG. 4, which heat the atmosphere inside the cure volume 8.

After the cure cycle has been completed, the heating elements 52 and pump 54 are turned off and the cured composite structure is allowed to cool. The top plate 14 and associated walls are raised by the lifting equipment 42 (see FIG. 6); then the tool 20 (with the cured composite structure supported thereon) is raised and separated from the base 12 using the tool handling equipment 44; and then the cured composite structure is demolded from the tool 20.

The curing apparatus and methodology disclosed herein has the following technical advantages:

(1) A typical cure vessel (autoclave) must be significantly larger than the part/tool, and is usually sized to accommodate curing of multiple parts (batch processing). Thus the energy and inerting required to achieve the necessary cure pressure profiles and inert environment is significant. The apparatus disclosed herein only involves pressurization and inerting of a volume that is only nominally larger than the part/tool.

(2) The mode of heat transfer in an autoclave or oven to heat the tool/part is primarily convection, which is inefficient, and consistent air velocities which are essential for uniform curing are difficult to achieve, especially when multiple parts are cured simultaneously. The apparatus disclosed herein provides heat via thermal conduction and/or radiation using integrally heated tools, supplemented as required by other heating methods such as infrared heaters (radiation). This enables increased temperature and pressure ramp rates, and thus reduces energy consumption and fabrication cycle time.

(3) Given their size and complexity, the cost and lead time to procure autoclaves is much higher than the smaller cure apparatus disclosed herein.

(4) The methodology disclosed herein involves an approach to composite part cure that is "right-sized" to the part and supports lean manufacturing objectives.

(5) With a typical autoclave, achieving current maximum cure temperature ramp rates (e.g., 5° F./minute) can be unachievable for larger or more complicated nacelle composite parts. The apparatus and methodology disclosed herein not only make that possible, but also enable far more rapid and uniform heating rates, thus significantly reducing cure cycle time without degradation of part quality.

The apparatus and methodology disclosed herein have significant potential for reduced capital cost and lead time, reduced part fabrication cost and lead time, and reduced energy consumption.

Figure 8:
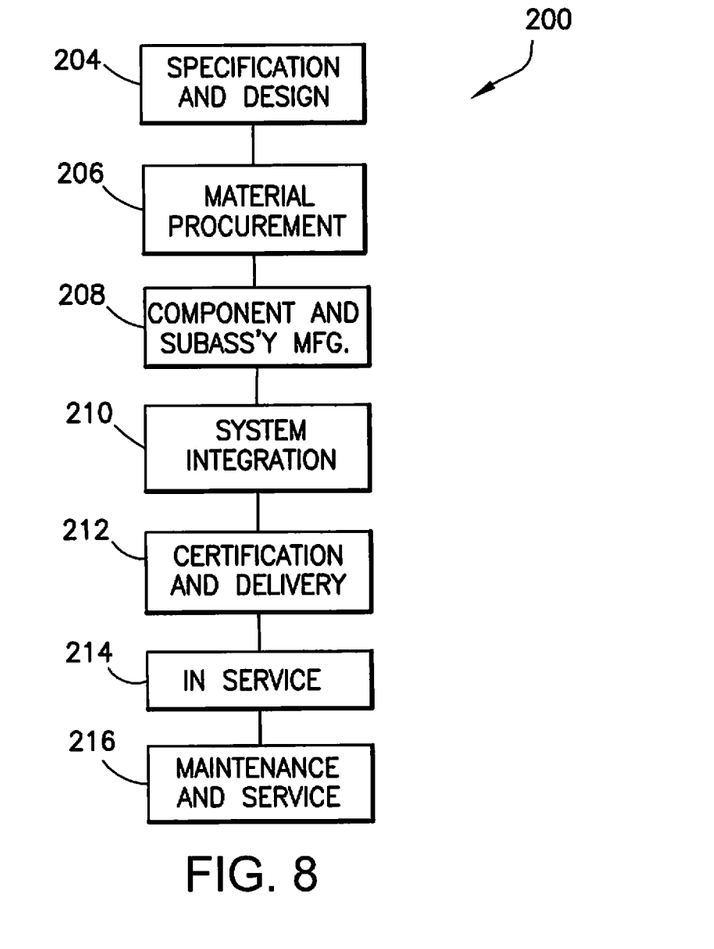
FIG. 8 is a flow diagram of an aircraft production and service methodology.
Figure 9:
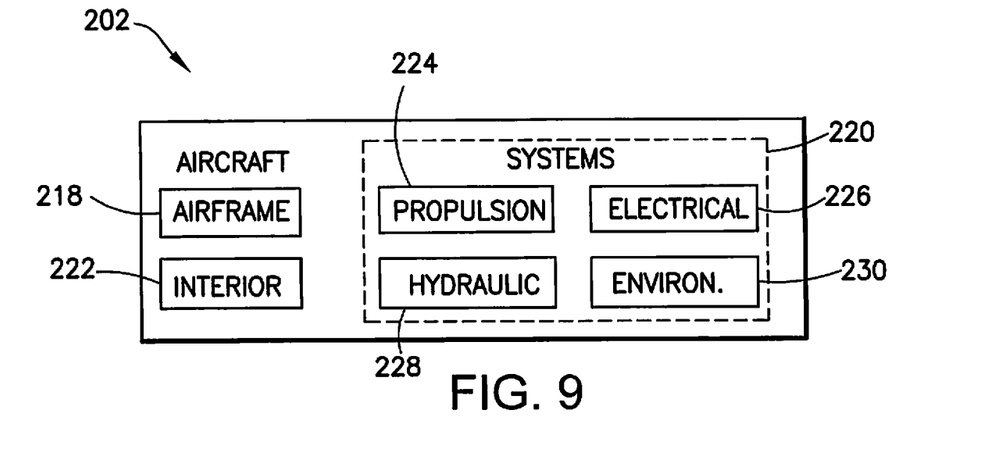
FIG. 9 is a block diagram showing systems of an aircraft.

The apparatus and method disclosed above may be employed in an aircraft manufacturing and service method 200 as shown in FIG. 8 for manufacturing and servicing an aircraft 202 as shown in FIG. 9. During pre-production, exemplary method 200 may include specification and design 204 of the aircraft 202 and material procurement 206. During production, component and subassembly manufacturing 208 and system integration 210 of the aircraft 202 take place. Thereafter, the aircraft 202 may go through certification and delivery 212 in order to be placed in service 214. While in service by a customer, the aircraft 202 is scheduled for routine maintenance and service 216 (which may also include modification, reconfiguration, refurbishment, and so on).

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 202 produced by exemplary method 200 may include an airframe 218 with a plurality of systems 220 and an interior 222. Examples of high-level systems 220 include one or more of the following: a propulsion system 224 (including engine nacelles of the type described above), an electrical system 226, a hydraulic system 228, and an environmental control system 230. Any number of other systems may be included. Although an aerospace example is shown, the principles disclosed herein may be applied to other industries, such as the automotive industry.

The apparatus and methods embodied herein may be employed during one of the stages of the production and service method 200. For example, composite nacelle components or subassemblies fabricated or assembled during component and subassembly manufacturing 208 may be cured using the apparatus and methods disclosed herein, thereby reducing the manufacturing cost of an aircraft 202.

While apparatus and methods for have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

The method claims set forth hereinafter should not be construed to require that the steps recited therein be performed in alphabetical order (any alphabetical ordering in the claims is used solely for the purpose of referencing previously recited steps) or in the order in which they are recited. Nor should they be construed to exclude respective portions of two or more steps being performed concurrently or alternatingly.

The alternative structures corresponding to the "a means for partitioning" recited in the claims include at least the following: plug 18 depicted in FIG. 1 and equivalents thereof; and tool 36 depicted in FIG. 5 and equivalents thereof. The alternative structures corresponding to the "means for producing a specified pressure" recited in the claims include at least the following: pump 54 depicted in FIG. 1 and equivalents thereof.

The invention claimed is:

1. A method for curing a composite structure, comprising: (a) forming a tool-composite structure assembly by placing an uncured composite structure in contact with an outer surface of a hollow tool having a closed contour; (b) placing the tool-composite structure assembly on a circular manifold which is attached to a base, the circular manifold being configured to couple the hollow tool to a source of energy; (c) enclosing a ring-shaped cure volume having an outer boundary that surrounds the tool-composite structure assembly with clearance from the uncured composite structure and a lower boundary formed in part by the base; (d) heating the uncured composite structure during a cure cycle while the uncured composite structure is positioned within the ring-shaped cure volume; and (e) producing a specified pressure inside the ring-shaped cure volume during the cure cycle.

2. The method as recited in claim 1, further comprising: removing the tool-composite structure assembly from the ring-shaped cure volume upon completion of the cure cycle; and demolding the composite structure from the hollow tool.

3. The method as recited in claim 2, wherein the composite structure is a component of an aircraft.

4. The method as recited in claim 3, wherein the aircraft component is one of the following components: an inlet inner acoustic panel, a fan cowl panel, a thrust reverser outer acoustic panel, a thrust reverser outer cowl panel or a thrust reverser inner wall panel.

5. The method as recited in claim 1, wherein the uncured composite structure has a closed contour, surrounds the hollow tool and is surrounded by the outer boundary of the ring-shaped cure volume.

6. The method as recited in claim 1, further comprising shaping the surface of the hollow tool to conform to an inner mold line of the uncured composite structure prior to step (a).

7. The method as recited in claim 1, wherein step (b) comprises indexing the hollow tool to the base.

8. The method as recited in claim 1, wherein step (c) comprises lowering a sleeve to a position whereat a lower end of the sleeve is supported by the base and the sleeve surrounds the hollow tool, the sleeve forming an outer boundary of the ring-shaped cure volume.

9. The method as recited in claim 8, wherein step (c) further comprises lowering a plug to a position whereat a lower end of the plug is supported by the base and the hollow tool surrounds the plug, the plug forming an inner boundary of the ring-shaped cure volume.

10. The method as recited in claim 8, further comprising attaching or connecting the sleeve to a top plate prior to step (c), wherein step (c) comprises lowering the top plate and the sleeve to respective positions whereat a lower end of the sleeve is supported by the base and the sleeve surrounds the hollow tool, the sleeve forming an outer boundary of the ring-shaped cure volume, and the top plate forming an upper boundary of the ring-shaped cure volume.

11. A method for curing a composite structure, comprising: (a) forming a tool-composite structure assembly by placing an uncured composite structure in contact with an outer surface of a hollow tool having a closed contour and having integrated heating elements; (b) placing the tool-composite structure assembly on a circular manifold which is attached to a base, the circular manifold being configured to couple the integrated heating elements to a source of energy; (c) enclosing a ring-shaped cure volume having an outer boundary that surrounds the hollow tool with clearance from the uncured composite structure and a lower boundary formed in part by the base; (d) activating the integrated heating elements to heat the uncured composite structure during a cure cycle; and (e) producing a specified pressure inside the ring-shaped cure volume during the cure cycle.

12. The method as recited in claim 11, further comprising: removing the tool-composite structure assembly from the ring-shaped cure volume; and demolding the composite structure from the hollow tool.

13. The method as recited in claim 11, wherein the uncured composite structure has a closed contour, surrounds the hollow tool and is surrounded by the outer boundary of the ring-shaped cure volume.

14. A method for curing a composite structure, comprising: (a) placing an uncured composite structure in contact with an outer surface of a hollow tool having a closed contour; (b) placing the hollow tool on a circular manifold which is attached to a base, the circular manifold being configured to couple the tool to a source of energy; (c) assembling a top plate, the base, an outer wall having a closed contour and an inner wall having a closed contour to form an enclosure that bounds a ring-shaped cure volume which is partly occupied by and has an outer boundary not in contact with the uncured composite structure; (d) heating the uncured composite structure during a cure cycle while the uncured composite structure is positioned within the ring-shaped cure volume; and (e) producing a specified pressure inside the ring-shaped cure volume during the cure cycle.

15. The method as recited in claim 14, further comprising integrating a multiplicity of heating elements in the hollow tool, wherein step (d) comprises supplying heat to the hollow tool via the circular manifold and the heating elements.

16. The method as recited in claim 15, wherein the heating elements supply heat to the hollow tool by transforming electric current into heat.

17. The method as recited in claim 15, wherein the heating elements supply heat to the hollow tool by carrying heated fluid.

18. The method as recited in claim 14, further comprising: removing the top plate; separating the hollow tool from the base; and demolding the composite structure from the tool.

19. The method as recited in claim 15, wherein the uncured composite structure has a closed contour, surrounds the hollow tool and is surrounded by the outer wall as a result of step (c).

20. The method as recited in claim 14, wherein the composite structure is a component of an aircraft.

* * * * *